Aug. 18, 1964   H. G. LIEN   3,144,916
CABLE HOUSING GREASE FITTING
Filed Aug. 20, 1962   2 Sheets-Sheet 1
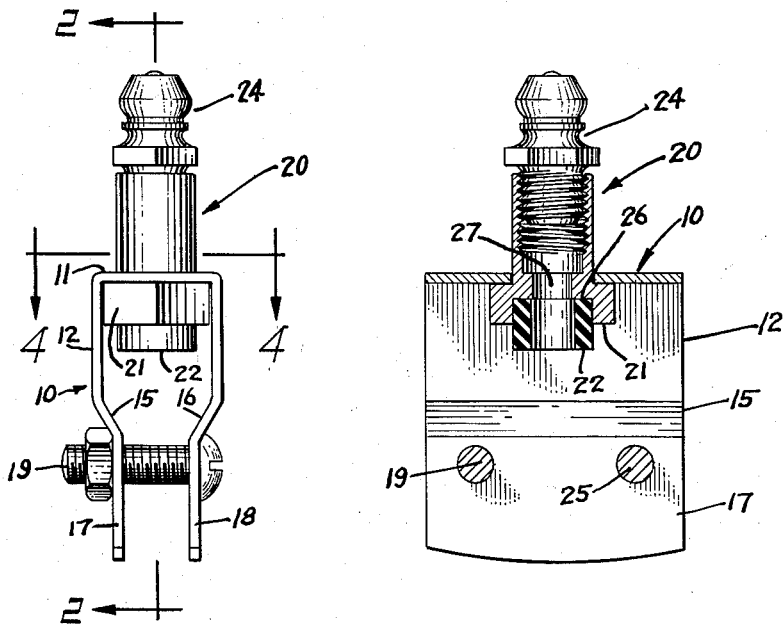
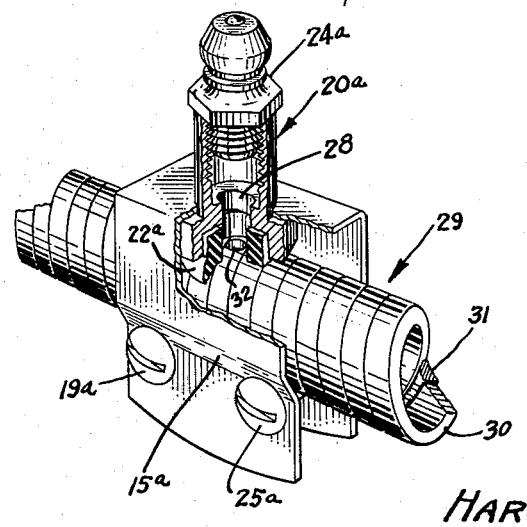
Fig. 1   Fig. 2   Fig. 3
INVENTOR
HAROLD G. LIEN
BY
ATTORNEYS Aug. 18, 1964     H. G. LIEN     3,144,916
CABLE HOUSING GREASE FITTING Filed Aug. 20, 1962     2 Sheets-Sheet 2

INVENTOR
HAROLD G. LIEN
BY *Moore White & Burd*
ATTORNEYS

United States Patent Office 3,144,916
Patented Aug. 18, 1964

3,144,916
CABLE HOUSING GREASE FITTING
Harold G. Lien, 308 4th Ave. NE., Osseo, Minn.
Filed Aug. 20, 1962, Ser. No. 217,906
8 Claims. (Cl. 184—105)

This invention is a grease fitting mounting for speedometer and tachometer cable and housing assemblies whereby those units may be greased without removing the cables from their housing coverings. The novel construction is such that the unit may be clamped on a housing and by removing the grease fitting therefrom use the bracket as a guide for drilling a hole into the interior of the housing through which grease may be forced into it. If the fitting is installed, of course, greasing of the cable merely amounts to applying a source of grease to the grease fitting and pumping grease into the unit.

Heretofore, when these cable and housing assemblies required greasing it was necessary to remove the entire assembly or at least disconnect one or the other ends of the cable housing and actually extract the cable therefrom. Thereafter, a lubricant was applied to the cable manually and then the cable gradually fed back into the cable housing. There are several difficulties with this type of greasing, however, not the least of which is that it requires considerable time and effort to grease these cables each time greasing is required. On commercial vehicles such as trucks and the like where engine and road speeds must be recorded faithfully, tachometers and speedometers must be greased regularly. This is a matter of sizeable expense for a trucking concern or other company operating numerous commercial vehicles. Failure to lubricate these cable and housing assemblies results in damage to them and inaccurate readings on the instrument powered by the cable.

Accordingly, it is a principal object of this invention to provide a novel grease fitting for speedometer and tachometer cables.

It is another object of this invention to provide such a grease fitting that may be installed quickly and easily.

It is yet another object of this invention that permits installation of this unit without the removal of the cable or housing from the vehicle on which it is mounted.

It is a still further object of this invention to provide such a unit in which the fitting itself will serve as a guide for drilling the grease admission hole thereby assuring that the unit and the hole for grease are properly aligned after installation.

Yet another object of this invention is to provide a grease fitting that includes a housing reinforcing means.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 1 is an enlarged end elevational view of the device;

FIGURE 2 is a vertical section taken on the line and in the direction of the arrows 2—2 of FIGURE 2;

FIGURE 3 is a perspective view of the device mounted on a portion of the housing for a speedometer cable and with portions of the device broken away to illustrate internal structure; the device shown in FIGURE 3 is a slight modification of that shown in FIGURES 1, 2 and 4;

Figure 4:
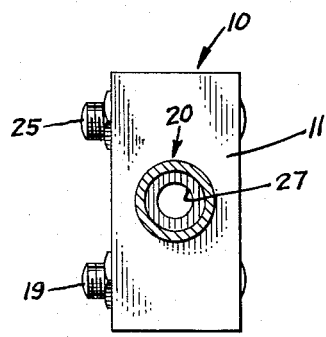
FIGURE 4 is a horizontal section taken on the line and in the direction of the arrows 4—4 of FIGURE 1.

Referring to the drawings and specifically first to FIGURE 1, there is a bracket 10 generally U-shaped in configuration and having the closed portion 11 and two legs 12 and 14 respectively. Each of the legs has a bent portion, 15 for leg 12 and 16 for leg 14, that extends slantingly toward the other to present a pair of inwardly facing slanting side walls. Thereafter, the legs continue with the straight portions 17 and 18 respectively for the legs 12 and 14. Straight portions 17 and 18 provide space through which suitable clamping means such as nut and bolt assemblies like the one 19 illustrated in FIGURE 1 may extend.

A sleeve generally designated 20 has a head portion 21 with parallel sides that fit nicely within the bracket 10 and hold the sleeve in a fixed relationship with respect to bracket 10 in terms of rotation. The inside portion of the head 21 carries a resilient washer 22 for purposes that will be explained hereinafter. The inside top of sleeve 20 is threaded to receive the usual ball-check type grease fitting 24. This unit is removable, however, for purposes that will be explained below.

In FIGURE 2, it can be seen that the bracket 10 is substantially as long as it is wide. In this view also, it can be seen that there is a second nut and bolt assembly shown only as a section of the bolt at 25. Also in this view, it is apparent that the resilient washer 22 is fitted into a recess 26 formed in the head 21. A channel 27 communicates through the head member 21 and into the inside of the hollow sleeve 20. This is also clearly seen in FIGURE 4.

Figure 5:
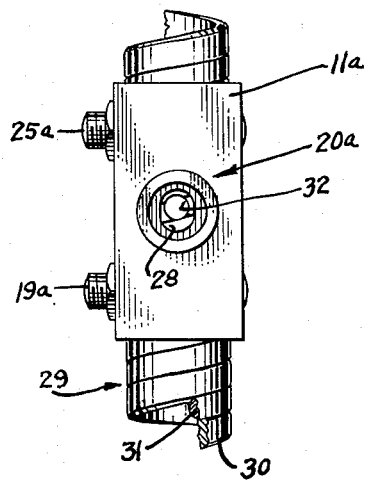
FIGURE 5 is a view similar to FIGURE 4 except taken with respect to FIGURE 3 rather than FIGURE 1.

The device shown in FIGURES 3 and 5 is identical to that illustrated in FIGURES 1, 2 and 4 except that the channel 28 through the inside of the sleeve down toward the bracket is elongated slightly as by broaching, for example, after the channel is formed in the first instance. In these figures, also, may be seen a fragment of a speedometer or tachometer cable housing 29.

On closer examination, it will be seen that this housing 29 is made up of a relatively broad and tough springy material formed into a helix 30 not easily drilled or distorted and a secondary helix 31 wound on the first to fill the gaps therebetween to more or less seal it against dust and dirt. This type of cable housing is sometimes called a double helix type. This sealing member has little or no resiliency and is comparatively soft. It serves just as a sealer and lubricator while the member 30 provides all the strength and actual protection of the housing. Since the member 30 is not only the main strength providing unit, but also considerably harder, it is preferred to drill the hole as seen at 32 in FIGURE 5 through the member 31 of the cable housing. Using the device such as that illustrated in FIGURES 1, 2 and 4, it is necessary to mount the device on the cable housing and while doing so with the grease fitting 24 removed sight through the sleeve 20 and make sure that the hole 27 is located over a portion of the member 31 in the cable housing as opposed to the member 30. With the device as illustrated in FIGURES 3 and 5, however, it is not necessary to do this since the elongated hole 28 is of such a nature that when drilling is done without first counter center punching cable housing 29, the drill will automatically slide off the harder material 30 and tend to drill principally in the softer material of 31. In this manner the strength of the cable housing 29 is not materially lessened by making the grease receiving opening in its surface.

In any case if helix 30 is partially cut in drilling, the bracket 10 surrounds the housing and reinforces it.

In FIGURES 3 and 5 the parts that are identical to those shown in FIGURES 1, 2 and 4 are assigned the same numbers followed by the suffix *a* to distinguish clearly between them. An examination of FIGURE 3 discloses that the resilient washer 20a is distorted by being pulled down against cable housing 29 and thereby forms a substantially grease-tight seal around opening 32. This is accomplished by the slanting shoulders 15a and 16a being forced against the cable housing 29 and the unit is clamped on housing 29 thereby pulling the bracket downward tightly against the top of the cable.

Grease fitting 24a being snugly screwed into the top of sleeve 20a seals the sleeve against outside dirt and hence the system remains clean against exterior dirt entering through the use of the device. At the same time it makes it possible to merely attach a grease gun to grease fitting 24a and thereby apply grease to the central portion of the cable and allow it to work its way toward the two ends. In this manner the cable can be greased much more rapidly than is true if it is necessary to remove it from the case and furthermore the grease will be distributed more evenly as it will not tend to be moved to one end or the other by sliding the cable through the case. When the cable is removed and greased by hand and reinserted, sliding the cable into the case tends to scrape grease off the end of the cable that is being forced through the case and collect it all at the end through which the cable is being inserted. Not only is it much quicker to grease the cable in this manner, therefore, but it is also much more efficient greasing.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A cable housing grease fitting structure comprising a bracket, a sleeve secured to said bracket with a portion of said sleeve inside and a portion outside said bracket, a resilient washer mounted in the portion of said sleeve on the inside of said bracket, means on said bracket for interacting with a cable housing for forcing said resilient washer into grease-tight association with a cable housing, and a check valve type grease fitting removably inserted in a portion of said sleeve extending outside said bracket.

2. The cable housing grease fitting structure of claim 1 in which said means consists of portions of said bracket that slant toward each other, spaced from each other and from said resilient washer, and tension producing means engaging portions of said bracket adjacent each of said slanting bracket portions to move them toward each other, whereby a cable housing placed in said bracket is forced against said resilient washer by tightening said tension producing means.

3. The cable housing grease fitting structure of claim 1 in which said sleeve has a hole therein that is elongated in the direction of said sleeve that will be parallel to the longitudinal axis of a cable on which it is mounted and means for holding said sleeve against rotational movement relative to said bracket.

4. A grease fitting for a speedometer cable comprising a bracket bent into a generally inverted U-shape having a closed portion and legs, said legs bent toward each other at a slant at corresponding points and then bent at corresponding points to form portions parallel to portions of said legs near the closed portion, a sleeve having a head thereon having parallel sides that are spaced apart a distance equal to said bracket closed portion measured from leg to leg, a hole in the closed portion of said bracket, said sleeve extending through said hole with its parallel head portions engaged by and trapped between the legs of said bracket, a recess in said head, a resilient bushing in said recess, a channel through said resilient bushing and said head into the inside of said sleeve, a portion of said sleeve extending outside of said bracket having internal threads, a grease fitting member threadably and removably received in said sleeve, and means for clamping said bracket on a speedometer cable housing.

5. The structure of claim 4 in which the U-shaped bracket is as substantially as long as it is tall and said means for urging said bracket legs toward each other comprise nut and bolt assemblies extending through said bracket just below the portions of the leg of said U-shaped bracket that extend toward each other.

6. The structure of claim 4 in which the channel in said sleeve extending from the interior through the head thereof is elongated in a direction parallel to the said parallel head portions trapped in said U-shaped bracket.

7. The combination of a cable housing of the double helix type and a housing grease fitting structure comprising, a bracket, a sleeve secured to the bracket with a portion of said sleeve inside and a portion of said sleeve outside said bracket, a resilient washer mounted in the portion of said sleeve on the inside of said bracket, means on said bracket interacting with double helix cable housing for forcing said resilient washer into greasetight association with said double helix cable housing, said cable housing having a hole therein aligned with said resilient washer opening, a check valve type grease fitting removably inserted in the portion of said sleeve extending outside of said bracket, said sleeve having a hole therein communicating between said check valve type grease fitting and said resilient washer; said hole being elongated in the direction of said sleeve that will be parallel to the longitudinal axis of said double helix type cable housing and means for holding said sleeve against rotational movement relative to said bracket; said elongated hole embracing a portion of each of both helices of said double helix type cable housing.

8. The combination of a cable housing, a grease fitting structure secured thereto comprising, a bracket, a sleeve secured to said bracket; at least a portion of said sleeve being within said bracket, a resilient washer mounted in a portion of the sleeve within said bracket, means on said bracket interacting with said cable housing for forcing said resilient washer into greasetight association with said cable housing; said cable housing having a hole therein aligned with said resilient washer opening, and a check valve type grease fitting removably inserted in said sleeve and extending outside said bracket.

References Cited in the file of this patent

FOREIGN PATENTS

| 140,672 | Great Britain | Apr. 1, 1920 |
| 617,909 | Great Britain | Feb. 14, 1949 |